M. F. NEWMAN.
WATER PURIFYING APPARATUS.
APPLICATION FILED MAY 12, 1916.
1,195,391.
Patented Aug. 22, 1916.
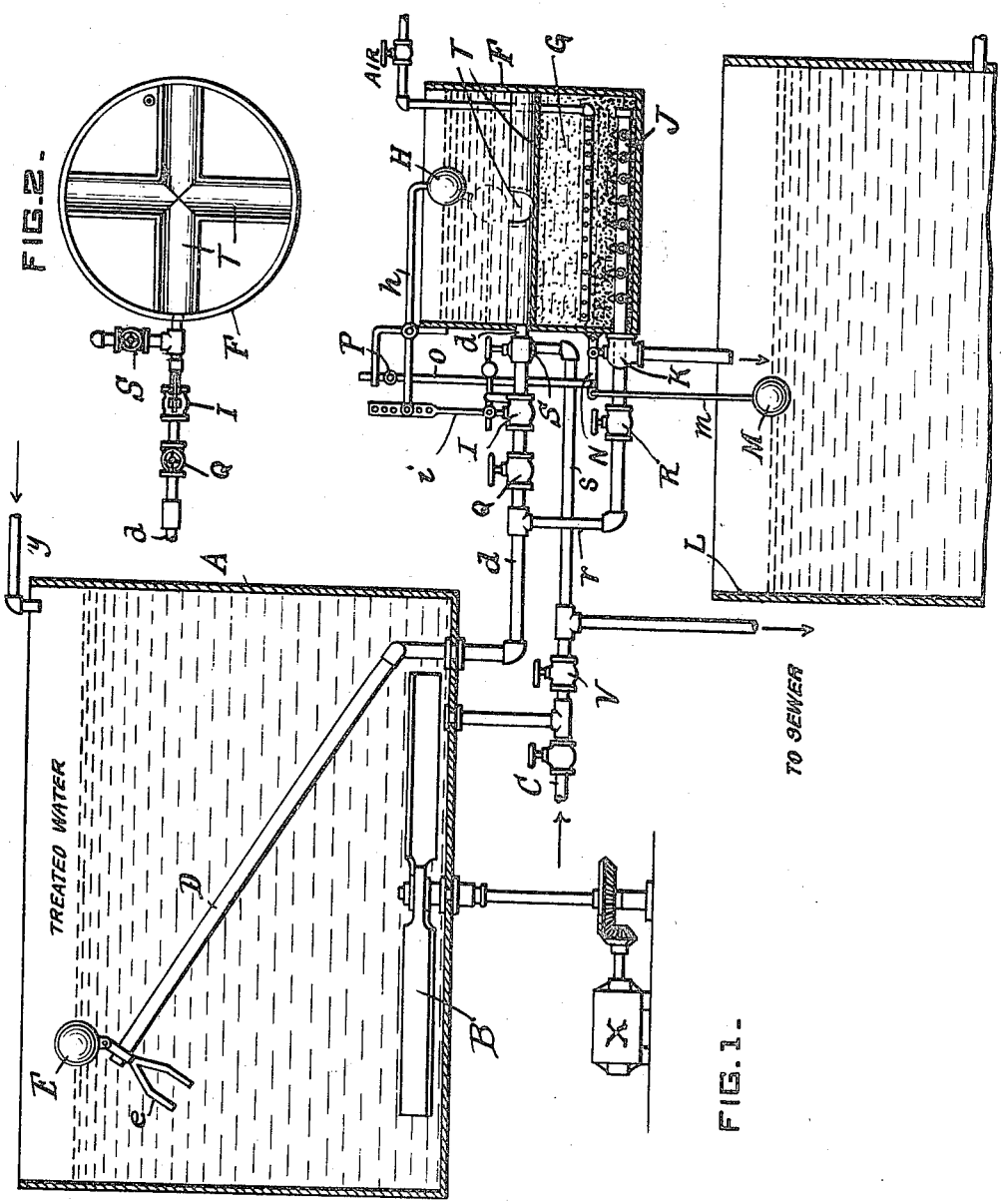

UNITED STATES PATENT OFFICE.

MARTIN F. NEWMAN, OF OAKMONT, PENNSYLVANIA, ASSIGNOR TO WM. B. SCAIFE & SONS COMPANY, OF PITTSBURGH, PENNSYLVANIA, A CORPORATION OF NEW JERSEY.

WATER-PURIFYING APPARATUS.

1,195,391.　　　　　Specification of Letters Patent.　　Patented Aug. 22, 1916.

Application filed May 12, 1916. Serial No. 96,958.

*To all whom it may concern:*

Be it known that I, MARTIN F. NEWMAN, a citizen of the United States, residing at Oakmont, in the State of Pennsylvania, have invented certain new and useful Improvements in Water-Purifying Apparatus, of which the following is a specification.

My invention relates more particularly to intermittent systems of water purifying apparatus, and to the regulation of the flow therethrough; its primary objects are to control the flow from the reaction and settling tank by means of the level in the purified water reservoir and at the same time control inflow to the filter by the level in the filter; to provide for use of chemically treated water under head for washing the filter, and thereby to avoid precipitates in the filter medium; to prevent the filter entirely emptying of water; and generally to provide simple, efficient, and automatic regulation of the flow of water through the system.

The invention is illustrated in a preferred form in the accompanying drawing, in which—

Figure 1 is a vertical section of the essential parts employed, and Fig. 2 is a plan of the filter alone.

Gravity filters require to be constantly washed in order to gain the greatest efficiency; if they are washed with raw water, the filter being already impregnated with the treating chemicals, there results a deposition of precipitates when the raw water comes in contact with the reagents left in the filter. For this reason there have been many propositions to wash the filter with purified water, but this requires an elevated storage tank and is practical only when the water after being purified is pumped up again to a sufficient elevation to give it a very considerable head. I meet the difficulty by using the chemically treated water directly from the settling tank itself, where there is an ample supply and ample head. For efficient action the filter should never be allowed to entirely empty itself of water, and both in filtering and washing, the water introduced into the filter should be introduced underneath a small amount of water standing on the surface in order to avoid displacing the sand bed etc. Again it is essential to good operation that the water flow from the treating tank and the level in the filter be immediately controlled by the level in the purified water reservoir. For these reasons I employ a system of float-operated valves by which the level in the purified water reservoir normally controls the height of water in the filter, and this in turn directly controls the flow from the settling tank to the filter; while incidentally the float-operated valve for feeding the filter is arranged to prevent the filter entirely emptying, by controlling the flow from the filter also, under certain conditions.

In the drawing, the water from supply C is first treated in the tank A by reagents adapted to cause precipitation of the impurities therein, being meantime agitated by the stirring device B driven by the motor X and reagents conveniently introduced by pipe Y. The treated water having been first settled, is then drawn off by a pivoted pipe D supported by a float E which is arranged with a stop e to prevent dropping so low as to allow the tank A entirely emptying. The water passes through the pipe d direct to the filter F, preferably entering the trough T placed at a point just above the sand bed G. The filter fills up to a given point, say about the level shown, whereupon the rising of the float H tilts the lever h and through the rod i throttles the control valve I. The water after flowing through the filter bed is drawn off by the multi-branched delivery pipe system J, and passing through the valve K empties into the purified water reservoir L. In this reservoir a float M operates, by a rod m, to tilt the lever N and thus regulate the delivery valve K. Also attached to the lever N I provide a rod O which is guided at the top and carries a pin P, standing in the path of movement of the lever arm h of the float H, so that if the level in the filter drops beyond the certain limit (as indicated by dotted lines), this lever arm h will itself lift the rod O and thereby tilt the lever N and close the valve K, independent of the action of the float M.

When it is desired to wash the filter, the inlet valve Q on the pipe d is closed, the valve S on branch pipe s to the sewer is opened, the valve R on the inlet branch r is also opened, and this connects also with the distributing pipe J. The result is that the treated water under a large head is forced upwardly through the distributing pipes J, through the filter bed G, overflows into the cross-shaped trough T and thence passes out the drainage pipe *s* through valve S. Meantime the falling of the float H will of course have closed the outlet valve K to prevent the water from escaping through valve K. The pipe marked "air" in Fig. 1 may be used to stir and aerate the filter bed, when desired. It will be seen that this arrangement avoids the requirement of any storage of purified water pumped direct or carried from a special overhead storage tank, in order to wash the filter. At the same time it enables me to use chemically treated water direct from the separate tank in which the treatment and settling is accomplished, so as to avoid the deposition of precipitate in the filter in washing. The controlling of the minimum level of water over the filter is accomplished with the same float that operates the inlet control valve, and the same float also that closes the filter outlet when it is desired to wash the filter. I regard it as important that the flow from the reaction and settling tank is controlled exactly and directly from the level in the filter and exactly though indirectly from the water in the purified water reservoir, as long as there is adequate supply, but when the supply fails the float H stops the outflow and prevents the filter entirely emptying.

Having thus described my invention and illustrated its use, what I claim is the following:

1. In water purifying apparatus the combination with a treatment and settling tank, a filter and a purified water reservoir, of a float-operated valve controlling the inflow to the filter by the level therein, a float-operated valve controlling the outflow from the filter by the level in the purified water reservoir, and means to wash the filter by reverse flow from the treatment and settling tank.

2. In water purifying apparatus the combination with a treatment tank, a filter and a purified water reservoir, of a float-operated valve controlling the inflow to the filter by the level therein, and a float-operated valve controlling the outflow from the filter by the level in the reservoir, the float operating the inlet valve being provided with devices for also closing the outlet valve at a regulated minimum of the level in the filter.

3. In water purifying apparatus the combination with a tank of treated and settled water and a gravity filter, of a system of reversing pipes and valves arranged to cause flow of treated water through the filter in reversed direction for washing, and an outlet valve for the filter provided with devices to close it by the fall of level in the filter, substantially as described.

4. In water purifying apparatus, the combination with an elevated tank of treated water, a filter and a receiving reservoir, of a float-operated valve controlling the outflow from the filter by the reservoir level, a float-operated valve controlling the inlet to the filter from the treated water tank, and means for reversing the flow of treated water through the filter, substantially as described.

5. In water purifying apparatus, a filter with a feeding and emptying system of pipes and valves, comprising a float-operated inlet valve and a float-operated outlet valve, and connections between them to control the level and automatically prevent the filter from entirely emptying of water under any condition.

6. In water purifying apparatus, a filter comprising a vessel partly filled with filtering material, a trough above the filter bed, a distributing pipe underneath the filter bed adapted both to draw off and to admit water to wash the filter, and automatic float-operated valves controlling the inlet to and the outlet from the filter adapted to prevent the filter from entirely emptying of water, substantially as described.

7. In water purifying apparatus comprising the combination with an elevated vessel of treated water, a filter and a pure water reservoir, of a float-operated valve controlling the outlet from the filter by the level in the receiving reservoir, and a float device working in the filter and adapted to shut said controlling outlet valve when the supply of treated water to the filter falls below a given minimum, substantially as described.

In testimony whereof I have hereunder signed my name.

MARTIN F. NEWMAN.